3,000,726
PRODUCTION OF METALS
Frank H. Spedding, Harley A. Wilhelm, and Wayne H. Keller, Ames, Iowa, assignors to the United States of America as represented by the United States Atomic Energy Commission
No Drawing. Filed Nov. 14, 1945, Ser. No. 628,652
5 Claims. (Cl. 75—84.1)

This application relates to the production of metals from metal halides and is particularly directed to the production of metallic thorium and similar high melting metals of group IVA of the periodic system including titanium, zirconium and hafnium. While the invention is particularly concerned with production of the aforesaid metals certain phases of the invention are applicable to the production of metals below the alkali and alkaline earth metals in the electromotive series.

The production of many metals has been proposed in the past by reaction of the oxide, chloride or other compound of the metal with sodium metal. However, it has been found that most of the processes described in the literature result in the production of the metal in a finely divided or pulverulent state, frequently in low yield, and in most cases the metal produced whether in massive form or powdered state has been contaminated with numerous impurities particularly the oxide of the metal undergoing preparation.

In accordance with the present invention a novel process has been provided whereby the metals herein contemplated may be produced in massive form (as relatively large solid aggregates) and relatively free from contamination by undesirable impurities, particularly the oxide. In accordance with this process a reducing metal of the group consisting of alkali metals and alkaline earth metals such as sodium, potassium, lithium, calcium, barium, strontium or magnesium, is reacted with a fluoride of the group IVA metal in a manner such that a final temperature above the melting point of the metal being prepared is established so as to form a molten metal phase and the resulting reaction mass is maintained in molten state for a time sufficient to permit separation of a molten pool of metal from the resulting slag which comprises a fluoride of the reducing metal. Calcium, magnesium and similar alkaline earth metals are especially useful as reducing metals in this process.

In conducting the reaction it is found desirable to establish a superatmospheric pressure upon the reaction mixture while the reaction is proceeding in order to maintain the reducing metal more or less uniformly dispersed throughout the reaction mass and thereby to ensure production of the resulting metal in comparatively high yield. This is particularly advantageous when a metal such as magnesium is used in the reduction process. Where metal of high purity is desired, the pressure may be released after substantial reaction has occurred and many of the impurities distilled from the molten metal. Alternatively, the molten metal may be allowed to solidify and subsequently may be remelted and impurities distilled therefrom.

Particularly advantageous results may be secured if the reaction is conducted in an elongated reactor of such length (usually 3 or more times its width) that the resulting molten pool of metal will have a minimum surface area in order to minimize loss of heat and premature solidification of the metal. Moreover, it is found especially advantageous to utilize a reactor which is provided with a refractory lining or interior surface comprising a refractory compound, preferably an oxide, of a metal above the metal undergoing reduction in the electromotive series. Alkaline earth metal oxides are particularly valuable for this purpose. Further details of construction of a type of reactor which has been found advantageous will be supplied hereinafter.

The development of sufficient heat in the reaction mixture to establish the reaction temperature and to maintain the reaction mass in molten state until separation of the phases into layers has been secured, may be accomplished by various means depending to a considerable degree upon the nature of the metal compound undergoing reduction and also upon the quantity of the reaction mixture. With certain fluorides and certain reducing metals such as calcium, sufficient heat may be developed by the exothermic reaction alone to effect this desired result provided proper precautions are made to prevent heat loss through the walls of the reactor and also provided that sufficient reaction mixture is used in the reaction. On the other hand where the volume of reaction mixture is small or where little heat is evolved during the reaction other precautions must be resorted to in order to establish and maintain the required temperature.

In accordance with the present invention it has been found that sufficient heat may be effectively introduced into the reaction by preheating the reaction mixture to the reaction temperature which is generally below the temperature at which the metal is molten. In such a case, this additional heat together with the heat evolved from the exothermic reaction is generally sufficient to secure the desired layer separation. On the other hand in the production of high melting point metals, particularly thorium metal, the introduction of heat by this manner alone may be found to be insufficient unless an unusually large charge of reaction mixture is used.

In accordance with a further modification of the invention, it has been found that the necessary heat required to ensure layer separation may be developed internally by conducting an auxiliary exothermic reaction in the reaction mixture of the metal fluoride and the reducing metal. This auxiliary reaction should be thermodynamically capable of developing a temperature higher than can be developed by the reaction of the reducing metal with the fluoride being reduced. For example, an additional halide of another metal which is below the reducing metal, and usually below the metal being produced in the electromotive series, may be added to the reaction mixture and the amount of reducing metal (calcium, magnesium, sodium etc.) increased accordingly. In such a case heat evolved from the auxiliary reaction aids in the establishment of the temperature required and/or presence of auxiliary reactants or reaction products lowers the melting point of the metal and/or slag so that the layer separation may be secured. A particularly advantageous result may be obtained by a reduction of a mixture of thorium fluoride and a chloride of the other metal since in such a case heat is added to the reaction and in addition the fluidity of the resulting chloride-fluoride slag and/or the melting point thereof is sufficiently low to permit very efficient separation of metal therefrom and consequently, the resulting metal is secured in high yield and good purity.

Various metals which are below the group IVA or other high melting metal in the electromotive series may be co-reduced with the group IVA metal by this process. The process may be particularly advantageously carried out by using a halide of a metal which will be readily separable from the thorium or similar metal undergoing production. For example, metals such as zinc, cadmium, mercury, lead, bismuth and other metals of low boiling point may be distilled from the relatively high melting point group IVA metals such as thorium thus permitting the production of these metals in high purity. Moreover, less volatile metals which are insoluble in the thorium or other metal may be used.

The process of conducting the reaction in the presence of an auxiliary exothermic reaction is especially advantageous where small quantities of metal are to be produced in a single batch although it is capable of use in large scale operations also. This process is also advantageous where alloys of the thorium or similar metal are to be produced. For example, thorium-beryllium, thorium-aluminum, thorium-zinc, etc. alloys may be produced in this manner. The relative proportions of thorium to other metal may be adjusted within comparatively wide limits in accordance with results desired. Where the metal which is co-reduced with the thorium is extremely light, as in the case of beryllium, the quantity of other metal halide used should be balanced if possible so as to avoid production of a metallic mixture having approximately the same density as the slag.

Other auxiliary exothermic reactions, capable of developing a temperature higher than the melting point of the group IVA metal being produced, can be used. For example, halogenating agents such as iodine, bromine, chlorine, hypochlorites, etc., sulphur or oxidizing salts such as chlorates, perchlorates, bromates, persulphates or similar salts of alkali or alkaline earth metals may be introduced into the reaction mixture and the reducing metal (calcium etc.) concentration in the mixture increased accordingly. Many of these auxiliary compounds, which may be termed "boosters," serve to aid in the formation of a more fluid slag or reaction mass at the operating temperature and thereby to facilitate separation of the metal therefrom.

The reaction may be conducted in a metallic reactor usually constructed of iron or steel and preferably lined with a resistant refractory of an alkaline metal oxide or mixture of such oxides. The problem of securing a satisfactory lining is of paramount importance. The metals undergoing reduction, as herein contemplated, in general alloy readily with iron or steel. Should the lining become defective during the operation, metallic thorium or similar metal tends to flow through the defective liner to the metal wall of the reactor, and to penetrate the wall thus creating an exceedingly hazardous condition due to the fact that the molten metal flowing through the opening created in the wall reacts violently with the air.

The problem of securing suitable linings for bombs or other reactors used in this process has been rather complex. Silicates have been found to be unsuitable because the reducing metals react with the silicates and consequently contaminate the metal produced. Applicants have found anhydrous alkaline earth metal oxides such as oxides of calcium, or magnesium to be highly effective lining materials.

The lining may be deposited upon the walls of the reactor by any convenient means. In accordance with one process described in a co-pending application of Harley A. Wilhelm, Serial Number 567,284, filed December 8, 1944, now Patent No. 2,785,064, an elongated cylindrical bomb provided with a centrally disposed mandrel of the size required for the reaction zone is filled with finely powdered anhydrous magnesium oxide, dolomite, calcium oxide or similar oxide and the bomb subjected to a rapid jolting action whereby the powder becomes compacted into a coherent well-bonded lining. Thereupon the mandrel is removed and the bomb is ready for use.

As previously noted, the process may be effectively conducted in an elongated reactor having a length at least three times its width or diameter since use of such a reactor permits ready establishment of slag and metal pools of minimum surface area. A cylindrical pipe or shell provided with top and bottom closed ends is suitable. These closed ends may be sealed if desired. When a relatively volatile reducing metal such as magnesium is used and where no booster is used or where a relatively non volatile booster is used, it is found preferable to mount the top or covering end upon the cylinder in a manner such that a minor amount of leakage of gas or vapor can take place and the pressure in the reactor during the reaction does not become excessive, being in such a case below the autogenous pressure of the system, and may be several hundred pounds per square inch or as low as 100 pounds per square inch. The amount of leakage permitted however, should not be so great as to prevent establishment of a superatmospheric pressure within the reactor by the reactants. A flange cover fitted to the top end of the reactor without a gasket provides a sufficiently loose fit.

The reactants should be anhydrous and substantially free from metal oxides and moisture. The reactants should be thoroughly mixed prior to introduction into the reactor and in order to secure satisfactory mixing the reducing metal should be finely divided (generally about minus 10 to minus 50 mesh). In most cases the fluoride undergoing reduction may be much finer usually being largely minus 100 mesh in particle size. Sufficient reaction mixture is used to substantially fill the reactor.

Following addition of the reaction mixture to the lined reactor a cover of the lining material is provided and the reactor is closed. The reaction is initiated by preheating as previously described until the reaction mixture or a portion of it or one or more of the components thereof has been heated to the temperature at which reaction will take place (about 400° C. to 600° C.), or where preheating is unnecessary the reaction may be initiated by means of an electrical fuse. This fuse may comprise a short length of resistance wire attached to a suitable source of electrical power and functions by heating a localized portion of the mixture to the temperature at which reaction initiates (usually about 400° C. to 600° C.).

After reaction has been initiated, substantial pressure develops within the system due to vaporization of the reducing metal or halides and to the fact that escape of the metals or vaporized halides from the system is prevented or substantially minimized. The pressure developed in general exceeds 1 to 3 atmospheres gauge and in some cases is of the order of 75 to 100 pounds or more per square inch gauge and serves to maintain the reducing metal more or less uniformly dispersed throughout the reaction mixture as reaction proceeds. The establishment of this superatmospheric pressure facilitates substantially complete reaction of the halide salts and permits production of metal in higher yield than when reaction is conducted at atmospheric pressure. The exact reasons for the improved results are not fully understood although it is probable that the pressure established tends to prevent reversal of the reaction at the elevated temperature due to back reaction of the resulting metal with the slag or the calcium oxide or other oxide of the liner and also the pressure prevents or minimizes in leakage of air or moisture into the reactor.

When a bomb or reactor of elongated construction as herein described is used, particularly advantageous results accrue due to the fact that the reaction may be initiated in one end of the bomb where a temperature above the boiling point of the reducing metal phase is established and the other end of the reactor may be maintained substantially below the boiling point of the reducing metal and frequently at a temperature several hundred degrees below that of the opposed end. This is found to be advantageous since it effectively minimizes establishment of excessive pressures in the reactor. Furthermore, after reaction is over or begins to subside and cooling of the reactor begins to occur, distillation of the reducing metal from the molten mass takes place and this metal condenses in the cold end of the bomb. Thus the temperature differential established permits substantial purification of the metal by removal of reducing metal, halides and other impurities as it is being cooled to solid state.

After reaction is completed the molten mass is maintained in molten state until the metal has substantially completely separated from the slag. Usually this requires one or several minutes. Thereafter the metal may be allowed to solidify into a solid ingot or it may be withdrawn from the reactor in molten state.

The resulting metal is comparatively free from impurities although it may contain small amounts for example, one or several percent, magnesium, calcium or other reducing metal which has been used to effect the reaction. Further, where a booster such as zinc chloride, iodine, etc., is used, the metal obtained may be contaminated with the booster or its reaction product. For example, when thorium fluoride and zinc chloride are co-reduced the resulting product will be a mixture or alloy of thorium and zinc and similar results are secured when halides of metals other than zinc are used in conjunction in the process herein contemplated. Further impurities may be present due to the use of reactants which are not completely pure or due to incomplete reduction and in addition some thorium or other metal oxide may be present due to partial reaction of the metal with the lining and/or to the presence of a residual amount of water in the mixture or reactor lining.

As previously stated, a substantial purification of the metal may be secured by heating the metal in vacuo at a temperature at which it is molten. In order to secure a satisfactory purification and prevent further oxidation or contamination of the metal, this treatment is preferably conducted in a closed crucible or melting chamber constructed of graphite or similar inert material and the absolute pressure established within the crucible is generally below about 1 to 2 millimeters of mercury frequently being of the order of 100 to 200 microns. Impurities such as magnesium, calcium or other alkaline earth metal, sodium, potassium or other alkali metal, cadmium, zinc or other metals, hydrogen and halogens etc. are removed to a very substantial degree by this process. The temperature of treating usually is 100 or 200° above the melting point of the metal undergoing purification treatment but below the boiling point of such metal.

After impurities have been distilled from the molten mass the molten metal may be drained from the crucible and cast into suitable billets or ingots. A further purification of this metal is thus secured since the nonvolatile impurities including oxides tend to form a scum or film particularly where the temperature of treating is maintained below the melting point of the respective oxide of the metal undergoing treatment. In such a case the oxide remains essentially solid or semisolid and the metal flows away from the oxide which in turn tends to adhere to the walls of the crucible or at least to separate substantially from the metal.

The following examples are illustrative.

Example I

A cylindrical bomb 1½ inches in diameter and 12 inches long and constructed of iron was provided with a liner approximately ⅜ inch in thickness of calcined calcium oxide. This liner was formed by placing a layer of calcium oxide on the bottom of the bomb, centrally disposing a cylindrical wooden mandrel in the bomb, tamping the space between the bomb and the mandrel full of the calcined dolomite (substantially CaO.MgO) and jolting the assemblage. Thereafter, the bomb and liner were heated for two hours at 850° C.

When the bomb was cool the following charge was thoroughly mixed and placed therein:

|  | Grams |
| --- | --- |
| Thorium floride | 35.0 |
| Iodine | 28.9 |
| Potassium chlorate | 4.64 |
| Calcium metal | 25.5 |

The thorium fluoride was finely divided having an average particle size about 200 mesh. Calcium in the form of finely cut chips was used and the other reactants also were in a relatively fine state of division so that upon mixing an essentially uniform mixture was secured. After the charge was placed in the bomb a layer of electrically fused dolomitic oxide was tamped on the top of the charge and the cover tightly fastened on the bomb. The bomb was placed in a furnace chamber heated to 770° C. and reaction initiated in about 10 minutes and the pressure rose substantially above atmospheric pressure probably 50 to 75 pounds per square inch or above. The bomb was left in the furnace for about 30 minutes thereafter and it was then removed and allowed to cool. Upon cooling it was found that the thorium metal was formed and collected at the base of the bomb in the form of a small well-bonded ingot.

Example II

The process of Example I was repeated using a sintered calcium oxide liner in lieu of the calcined dolomite liner and using the following charge:

|  | Grams |
| --- | --- |
| Thorium fluoride | 33 |
| Iodine | 82 |
| Calcium | 25 |

The bomb was placed in a furnace heated to 865° C. and reaction initiated after 6½ minutes and a superatmospheric pressure was established. Heating was continued thereafter for a period of 1½ minutes. A metal ingot of thorium was secured.

Example III

The process of Example I was repeated using the following charge in a somewhat larger bomb:

|  | Grams |
| --- | --- |
| Thorium fluoride | 113 |
| Calcium | 75 |

160 grams of bromine (50 milliliters at 20° C.) was placed in a glass bubble having a ½ inch opening at the top and this bubble was introduced into the bomb. The bomb was closed and heated in a furnace having a temperature of 875° C. Reaction initiated in 11 minutes superatmospheric pressure developed in the bomb and a substantial quantity of thorium in the form of an ingot was secured.

Example IV

A bomb was prepared by welding a closed end to an iron pipe 6 inches in diameter and 36 inches long and providing a flange on the other end capable of receiving a closing cover. The bomb was provided with a liner by depositing a layer of dry calcined calcium oxide upon the floor of the bomb, centrally disposing a central wooden mandrel pouring in the calcium oxide in the space around the mandrel and jolting the assembly on a mechanical jolter at a jolting rate of about 250 jolts per minute. The following charge was then introduced:

|  | Pounds |
| --- | --- |
| Thorium fluoride | 17.05 |
| Zinc chloride | 3.77 |
| Calcium | 6.65 |

The charge was weighed and mixed in a dry room, precautions being taken to prevent absorption of an appreciable amount of moisture by the zinc chloride. A layer of dry calcium oxide was packed on top of the charge and the top flange was bolted on. The bomb was inserted in a gas burner furnace leaving the end which had the flanged cover exposed to the atmosphere. The temperature of the furnace was 1160° F. and the reaction initiated in 14½ minutes. The top portion of the reactor was several hundred degrees cooler than the central portion thereof. Several minutes after reaction was initiated the bomb was removed from the furnace and cooled with a water spray.

The top flange was removed and an ingot weighing about 13 pounds and having the following analysis was obtained.

| | | |
|---|---|---|
| Th (total) | percent | 91.2 |
| Zn | do | 9.65 |
| C | do | 0.69 |
| B | p.p.m. | 0.1 |
| Be | p.p.m. | 1.5 |
| Ca | p.p.m. | 1710 |
| Cd | p.p.m. | 0.88 |
| Mg | p.p.m. | 1000 |

The ingot was melted by heating to about 1900° C. in a vacuum at an absolute pressure below about 1 millimeter of mercury and after impurities had distilled was cast into a beryllium mold. After casting, the product thus obtained contained less than 100 p.p.m. of zinc, no cadmium or boron and only traces of calcium, beryllium, carbon and magnesium.

*Example V*

The process described in Example I was repeated using a sintered calcium oxide crucible in an iron bomb 2½ by 12 inches and using the following charge:

| | Grams |
|---|---|
| Thorium fluoride | 250 |
| Berylium fluoride | 5 |
| Iodine | 205 |
| Calcium | 121 |

The bomb was heated to 656° C. and the reaction initiated at this temperature. After cooling, a thorium-beryllium alloy which was quite malleable and quite resistant to corrosion was secured in the form of a massive ingot.

*Example VI*

The process of Example V was repeated using the following charge:

| | Grams |
|---|---|
| Thorium fluoride | 500 |
| Beryllium fluoride | 382 |
| Iodine | 415 |
| Calcium | 625 |

A thorium berylium alloy was secured containing about 17 percent by weight beryllium and 83 percent by weight thorium. The product produced was hard and quite resistant to corrosion.

*Example VII*

The process of Example IV was repeated using a mixture of bismuth and thorium fluoride in the proportion of one mole of $ThF_4$ to one-third mol of $BiF_3$ to 3 mols of calcium metal. Thorium-bismuth alloy separated and was recovered and bismuth removed by distillation as in Example IV.

The invention as herein described had been particularly concerned with the production of the metals desired from their solid fluorides which have the general formula $MF_x$ where M is the metal concerned and $x$ is a small whole number, usually being 2, 3 or 4 depending upon the respective valence of the metal. However, where the fluoride is highly volatile as in the case of $TiF_4$ it is desirable to avoid use of such a fluoride due to the high pressures developed. In such a case more complex, less volatile fluorides such as $Na_2TiF_6$ or $K_2TiF_6$ may be used.

The process may be applied to use in connection with the production of metals from other halides such as chlorides, bromides or iodides of the above metals. At the same time, however, production of metal from these compounds may be disadvantageous in some cases due to the high pressures which may be developed in the reactor and also due to the hygroscopicity of the chlorides and similar halides. The hygroscopicity of this type of halide is particularly objectionable because the water contaminant thus introduced in the reaction materially reduces the yield of metal secured and makes the separation of the molten phases more difficult. In consequence it is preferred to contact many of the reactions herein contemplated using the fluoride. However, mixtures of fluoride and chloride may be used as previously described and in such a case increased fluidity in the slag permits more recovery of the metals produced.

Similar results may be secured by using other chlorides-fluoride mixtures or other mixtures of metal fluorides with other metal halides. For example, a mixture of $ThF_4$ and $ThCl_4$, $ThI_4$, or $ThBr_4$ may be co-reduced. Likewise, a mixture of $ThCl_4$ and $ZnF_2$ may be reduced as herein contemplated.

While the invention is particularly concerned with the reduction of halides of the group IVA metals, certain phases thereof may be advantageously applied to reduction of metal halides generally. Thus other halides may be reduced using a booster to generate a temperature sufficiently high to form molten metal or at least ensure substantially complete reaction.

For example, the co-reduction by means of a metal higher in the electromotive series of a fluoride of a metal lower in the series with another halide of the same or different metal such as the chloride of the same or another metal is advantageous to form a more fluid and/or lower melting slag which separates more readily from the molten metal formed.

In addition the reduction of numerous halides of metals having high melting points for example above 1000° C. may be materially facilitated by conducting the reduction together with an auxiliary reaction capable of developing a temperature above that which can be developed by reduction of the halide of the high melting metal alone. For example, halides of beryllium, or metals of group VA or group VIA may be reduced by an alkali or alkaline earth metal while simultaneously reducing another metal halide having a lower energy of formation and preferably having a lower boiling point than that of the high melting metal. Thus, chromium, uranium, molybdenum, tungsten, tantalum or other metals of groups IVA, VA and VIA (in the series beginning with potassium and subsequent series) may be effectively produced by co-reducing the halides with the halides of the metals of groups IIB, IIIB, IVB and VB of the periodic system. Likewise alkali and alkaline earth metals may be simultaneously reacted with the metals in group IVA, groups VA and VIA and a halogen or an oxidizing agent such as chlorate, perchlorate, etc. For example, beryllium fluoride and lead chloride, cadmium chloride or zinc chloride or a mixture of the chloride and fluoride of beryllium may be co-reduced by calcium metal as herein contemplated as well as many other metals. In producing the highly refractory metals such as tantalum or tungsten difficulty may be encountered in achieving the required temperature to form molten metal. However, powdered metal may be produced by this process or the reactants may be separately preheated to a high temperature and mixed to achieve the high temperature required for molten metal in such a case.

The following examples illustrate such a process.

*Example VIII*

Reduction of cerium chloride was accomplished in a bomb 3 inches in diameter and 22 inches long and lined with calcined calcium oxide. The charge used was as follows:

| | Grams |
|---|---|
| Cerium chloride | 1600 |
| Iodine | 1040 |
| Calcium | 584 |

The bomb was heated to about 530° whereupon reaction initiated. Cerium metal collected in a smooth compact billet at the bottom of the bomb. This cerium was purified by remelting in a magnesium oxide crucible at about 860° C. and an absolute pressure of about 1 millimeter and casting in a graphite mold. Magnesium may be used in lieu of calcium in this process.

Example IX

An iron bomb 2½ inches in diameter and lined with a sintered calcium oxide liner was loaded with the following mixture:

240 g. $K_2TiF_6$
    254 g. iodine
    144 g. calcium

The mixture was heated to 570° C. whereupon reaction initiated. Molten titanium was formed and collected at the bottom of the bomb. This process may also be used for production of zirconium using $K_2ZrF_6$.

Although the present invention has been described with particular reference to the specific details of certain embodiments thereof it is not intended that such details shall be regarded as limitations upon the scope of the invention except insofar as included in the accompanying claims.

What is claimed is:

1. A process for the production of massive metal of group IVA of the periodic table which consists of preparing a mixture consisting essentially of a fluoride of said metal, a reducing metal of the group consisting of alkali and alkaline earth metals, and a material thermally capable of reacting with said reducing metal to develop a temperature above the temperature which can be developed by reaction of the reducing metal with the fluoride of the group IVA metal, placing said mixture in a reactor, closing the reactor, heating the reactor and said mixture to initiate reaction of the components of said mixture whereby the reaction raises the temperature of the reaction product to a temperature above the melting point of said metal of group IVA, and superatmospheric pressure builds up maintaining the temperature and superatmospheric pressure above said melting point to permit substantial separation of a molten metal phase and a molten slag phase, cooling to solidify said phases, opening said reactor, and removing said phases.

2. A process for the production of massive thorium which consists of preparing a mixture consisting essentially of thorium fluoride, a reducing metal of the group consisting of alkali and alkaline earth metals, and a material thermally capable of reacting with said reducing metal to develop a temperature above the temperature which can be developed by reaction of the reducing metal with thorium fluoride, placing said mixture in a reactor, closing the reactor, heating the reactor and said mixture to initiate reaction of the components of said mixture whereby the reaction raises the temperature of the reaction product to a temperature above the melting point of said thorium fluoride, and superatmospheric pressure builds up maintaining the temperature and superatmospheric pressure above said melting point to permit substantial separation of a molten metal phase and a molten slag phase, cooling to solidify said phases, opening said reactor, and removing said phases.

3. The process of claim 2 wherein the material thermally capable of reacting with said reducing metal to produce a temperature above the temperature developed by the reaction of reducing metal and thorium fluoride is a halogen.

4. The process of claim 3 wherein the halogen is iodine and the reducing metal is calcium.

5. The process of claim 2 wherein the material thermally capable of reacting with said reducing metal to produce a temperature above the temperature developed by the reaction of reducing metal and thorium fluoride is a decomposable oxysalt.

References Cited in the file of this patent

UNITED STATES PATENTS

| | | |
|---|---|---|
| 1,437,984 | Marden | Dec. 5, 1922 |
| 1,646,734 | Marden | Oct. 25, 1927 |
| 1,671,213 | Van Arkel et al. | May 29, 1928 |
| 1,728,942 | Marden | Sept. 24, 1929 |
| 2,165,742 | Blackwell et al. | July 11, 1939 |
| 2,205,854 | Kroll | June 25, 1940 |
| 2,787,537 | Wilhelm | Apr. 2, 1957 |
| 2,787,538 | Spedding et al. | Apr. 2, 1957 |
| 2,830,894 | Spedding et al. | Apr. 15, 1958 |

OTHER REFERENCES

Journal American Chemical Society, vol. 32, page 334.

Goggin: Metallic Uranium, Industrial and Engineering Chemistry, vol. 18, pp. 114–116 (1926).